March 31, 1964

L. T. GARNETT 3,127,558

SEALED ELECTROMECHANICAL FORCE BALANCE UNIT WITH AN
EXTERNALLY ADJUSTABLE MAGNETIC CIRCUIT

Filed Sept. 15, 1959

INVENTOR.
LAWRENCE T. GARNETT
BY
Mason, Kolehmainen, Rathburn and Wyss
ATTORNEYS.

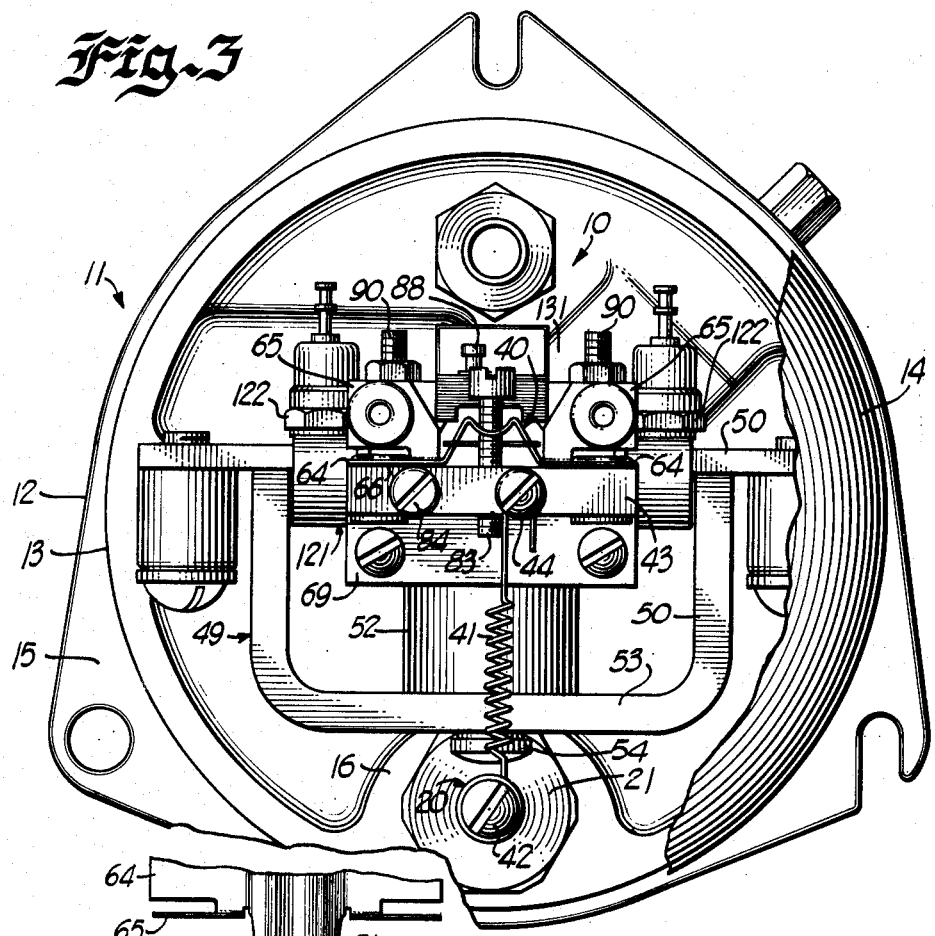

United States Patent Office 3,127,558
Patented Mar. 31, 1964

1

3,127,558
SEALED ELECTROMECHANICAL FORCE BALANCE UNIT WITH AN EXTERNALLY ADJUSTABLE MAGNETIC CIRCUIT
Lawrence T. Garnett, Stratford, Conn., assignor, by mesne assignments, to Robertshaw Controls Company, a corporation of Delaware
Filed Sept. 15, 1959, Ser. No. 840,037
4 Claims. (Cl. 324—34)

The present invention relates generally to electromechanical systems and more particularly to improvements in electromechanical balance units of the type that are sealed in explosion-proof housings. A sealed electromechanical system, according to the instant invention, may be useful in differential pressure transmitters adapted to respond to differential pressure by developing electrical signals for transmission to remotely located equipment for indicating, recording and/or controlling the differential pressure. A transmitter recording system is shown and described in detail in a copending application of Charles G. Roper and Edgar S. Gilchrist, Serial No. 389,564, filed November 2, 1953, now Patent No. 2,949,273, and reference may be had to this copending application for a detailed description of a suitable transmitter unit wherein the electromechanical balance unit of the present invention may be employed. The present electromechanical system has particular application to an explosion-proof type of differential pressure transmitter, such as is disclosed in copending U.S. patent application, Serial No. 683,729, filed September 13, 1957, now Patent No. 3,061,823, by Harold E. Crossley, Jr., and assigned to the same assignee as the present application, and to an electromechanical balance unit such as is disclosed in copending U.S. patent application, Serial No. 616,485, filed October 17, 1956, now Patent No. 2,913,672, by Edgar S. Gilchrist and Arthur J. Sable.

Briefly considered, a transmitter system of the type described in the above-identified copending applications, includes an electromechanical force balance unit and an associated oscillator, deflection of the beam of the balance unit in proportion to the variations of any measured input variable being employed to vary the impedance of an electrical element such as the inductance of a planar or control inductor and this change in inductance is used to change the tuning of the oscillator. An output current is developed proportional to the displacement of the beam so that variations of the output current over a predetermined range of values corresponds to the variation of the measured input variable over a corresponding span of measured values as represented by the deflection of the beam. A portion of the output current of the oscillator is fed back to a feedback coil which is mounted on the beam and positioned in a magnetic field so that a force is exerted on the beam in opposition to the input force. In this connection it will be understood that deflection of the beam of the force balance unit may be produced in any desired manner in accordance with the variable to be measured in so far as the present invention is concerned. The feedback coil is wound upon a coil form comprising a thin hollow sleeve of, for example, aluminum and carried upon the planar end of the balance beam. The feedback coil moves axially between the poles of a magnet, such as a permanent magnet, whose poles may

2 define an annular air gap within which a concentrated magnetic field is developed. Movement of the beam varies the inductance of the control inductor; the beam being displaced relative to the air gap in an amount proportional to the measured variable and counterbalanced by the magnetic force on the feedback coil. It is desirable to provide for varying the span of measured values of the measured variable in relation to the predetermined range of output values obtained by the variations in the displacement of the beam relative to the air gap.

Prior attempts to vary the span of measured values relative to the predetermined range of output current values have not been entirely satisfactory as applied to explosion-proofed electromechanical balance units. As described more fully in the aforementioned Crossley application, one such adjustment provided for a fine range adjustment potentiometer connected to the circuit. Such a potentiometer, while satisfactory under many conditions, was particularly troublesome in an industrial environment due to difficulty encountered with wire corrosion and poor connections unless the potentiometer is hermetically sealed; moreover, difficulty is experienced in that the potentiometer is not readily adjustable while maintained in an explosion-proof condition.

It is, therefore, desirable to provide means for varying the span of measured values in an electromechanical balance unit relative to the range of output current values while maintaining the balance unit in an explosion-proof condition. Consequently, it is desirable that the span of measured values may be varied by means which are adjustable from the exterior of the explosion-proof housing. It is, accordingly, an object of the present invention to provide an improved means for adjusting the span of measured values of an electromechanical balance unit which is housed in an explosion-proof housing.

Another object of the present invention is to provide an improved electromechanical balance unit.

Another object of the present invention is to provide an improved electromechanical balance unit which is contained within an explosion-proof housing and in which the span of measured values may be readily adjusted from the exterior of the housing.

It is a further object of the present invention to provide improved means for varying the span of measured values of an electromechanical balance unit relative to the range of output current values, the range being readily adjusted from the exterior of the housing while the electromechanical balance unit is enclosed within an explosion-proof housing.

The foregoing and other objects are achieved according to the invention by providing a shunting ring of magnetic flux conductive material positioned in the housing and adapted to bypass at least a portion of the magnetic flux normally established across the air gap through which the feedback coil moves, and further providing means which are adjustable from the exterior of the housing for moving the shunting ring relative to the air gap, thereby adjustably varying the amount of magnetic flux bypassed through the shunting ring.

More specifically, the shunting ring is mounted on a bracket supported on the frame of a balance unit; the bracket having an opening through which one of the pole pieces of the magnet extends. The shunting ring is positioned in the opening of the mounting bracket and encloses the pole piece. The bracket and ring are resiliently biased to a predetermined position around the central pole piece so as to shunt a part of the magnetic flux normally established across the air gap. An adjustable screw for adjusting the position of the ring with respect to the pole piece is provided which may be adjusted from the exterior of the housing, and engages the mounting bracket at an angle relative to the plane thereof.

The invention, both as to its organization and method of operation, together with further objects and advantages thereof, will best be understood by reference to the following description taken in connection with the accompanying drawings, in which:

FIG. 3 is a top view, partly in section, of the improved balance unit of FIG. 1; and FIG. 4 is a fragmentary view, partly in section, taken along line 4—4 of FIG. 1.

Figure 1:
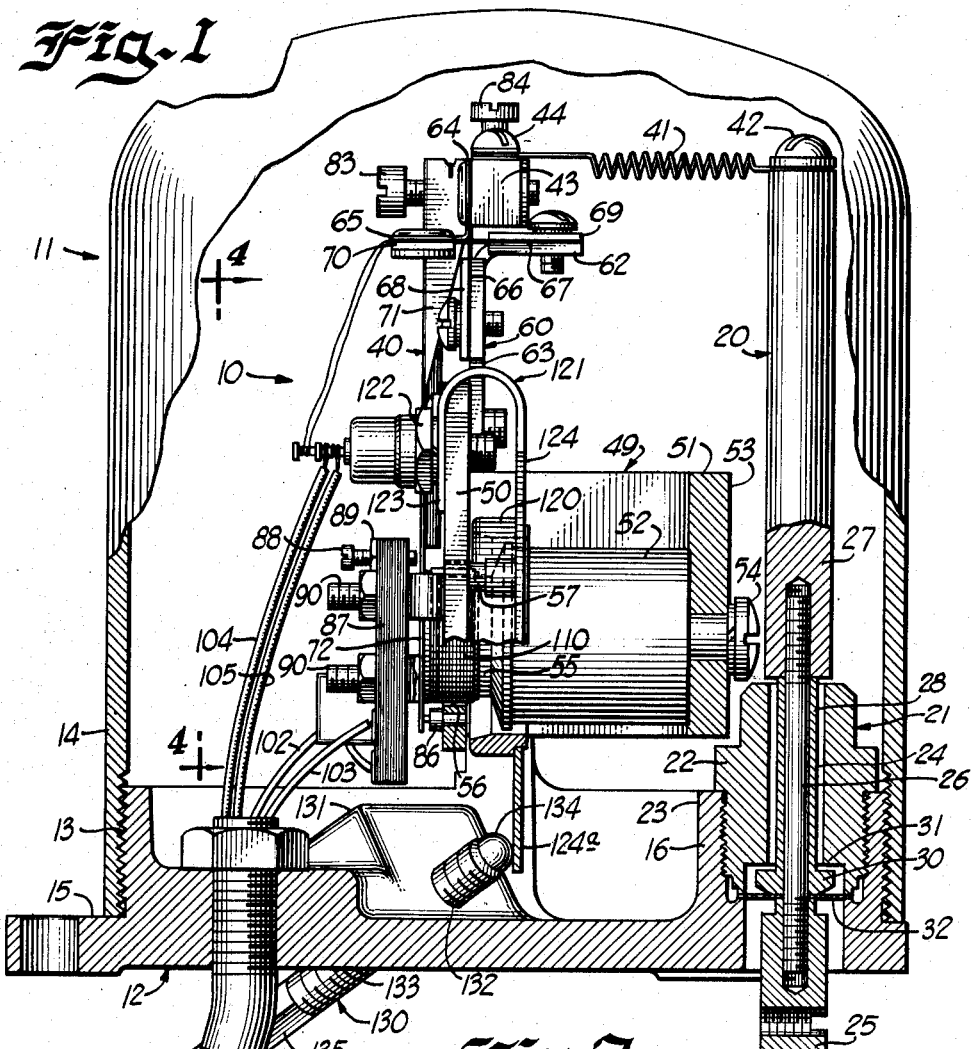
FIG. 1 is a front elevational view, partly in section, of the improved balance unit according to the present invention.

Referring now to the drawings, there is illustrated an electromechanical balance assembly illustrated generally at 10 and positioned within an explosion-proof housing indicated generally at 11. The housing 11 enclosing the balance assembly 10 is of two-piece construction including a base portion 12 having an externally threaded, upwardly extending, annular ring 13 for accommodating a removable cup-shaped cover 14 which is threaded onto the ring 13 and is seated against an annular lip 15 formed on the base. The base portion 12 further includes an upwardly extending, internally threaded, cylindrical boss 16, For the purpose of transmitting mechanical movement, corresponding to a measured input variable, to the balance assembly 10 through the explosion-proof housing 11, there is provided a vertically extending lever 20 which enters the housing 11 through an inlet seal which provides an explosion-proof closure for the housing and at the same time is so constructed that only paths of long, narrow tortuous configurations are provided from the interior of the housing to the exterior. Specifically, a generally cylindrical sleeve 21 is threaded into the boss 16 until an annular lip 22 at its upper end abuts against the extreme upper end 23 of the boss 16. The sleeve 21 is provided with a central, axial opening 24. The lever 20 includes a lower lever portion 25, an upper lever portion 27, and a central lever portion 28. An axially extending stem 26, which is threaded at its lower end into the lower lever portion 25, extends through the central lever portion 28 and has a threaded upper portion thereon which is threaded into an axial opening in the upper lever portion 27 in order to unite the three lever portions 25, 27 and 28 into a unitary member. The central lever portion 28 contains a collar 30 adapted to cooperate with a shoulder 31 of the sleeve 21 to limit the upward movement of the lever 20. The lower end of the upper lever portion 27 is adapted to cooperate with the upper end of sleeve 21 to limit the downward movement of the lever 20. An annular sealing gasket or diaphragm 32, which is welded along its inner periphery to the collar 30 and is welded along its outer periphery to the lower end of the sleeve 21, provides a pivot or fulcrum for the lever 20 and at the same time seals the housing 11. The lever 20, therefore, pivots about the diaphragm 32 in response to the movement of a measured input variable (not shown) to transmit the movement of the measured variable to the balance assembly 10 as hereinafter more fully described. The axial opening 24 is of sufficiently large diameter to permit the pivotal movement of the lever 20.

The interior of the upper housing 11 is at atmospheric pressure and, accordingly, in the event of an explosion within the housing 11 a high pressure is generated within the housing 11 which acts against the sealing gasket 32 to force the lever 20 downwardly. However, the lower portion of the upper lever portion 27 seats against the upper end of the sleeve 21 and prevents further downward movement of the lever 20, thus preventing rupture of the sealing diaphragm 32 and at the same time confining the explosion within the housing 11. Moreover, flames which may accidentally be developed within the electrical components disposed within the housing 11 are prevented from spreading due to the long, narrow, tortuous path therein provided, as more fully explained in the above-referenced copending Crossley application.

A connection from the lever 20 to a pivotally mounted balance beam 40 forming the heart of the electromechanical balance assembly 10 is completed through a linear loading spring 41 which is attached at one end to the extreme upper end of the lever 20 by means of the machine screw 42 and at its other end is secured by a clamping screw 44 to a bar 43 mounted on the balance beam 40. The electromechanical balance assembly 10 is generally similar to the arrangement described in the above-referenced copending application of Gilchrist et al., and is similar also to the balance assembly disclosed in the above-referenced copending application of Crossley, Jr.

Specifically, the components of the electromechanical balance assembly 10 are mounted upon a generally rectangular base plate 50 which is secured by means of screws to a pair of mounting bosses formed integral with the base portion 12 of the balance assembly housing 11. The base plate 50 functions to support the magnetic structure of the balance assembly 10 and also supports the deflectable balance beam 40 of the balance assembly and the electrical circuit components associated therewith so that a rugged, compact structure is provided wherein the parts may be readily assembled with a minimum number of mechanical tolerances while at the same time the balance unit is rendered relatively insensitive to changes to ambient temperature and the attendant expansion and contraction of its metal parts.

More particularly, a magnetic frame or structure, indicated generally at 49, includes the base plate 50 and a substantially U-shaped member 51 staked to the base plate 50. The base plate 50 forming one side of the magnetic frame 49 contains an aperture or circular opening 56. A cylindrical magnet 52 is secured to a top wall or bight portion 53 of the U-shaped member 51 at the opposite side of the magnetic frame 49 by means of a bolt 54 extending through the center of the magnet 52 and into a cylindrical pole piece 55 (best seen in FIG. 2) of reduced diameter and extending through the aperture 56 so that the magnet and the pole piece are held in assembled relation on the wall 53; the edge or boundary of the aperture 56 cooperates with the pole piece 55 to define an annular air gap 57 within which a concentrated magnetic field is developed, it being understood that the magnetic circuit is completed from the aperture 56 through the frame 49 including the base plate 50, the walls of the U-shaped member 51, and through the magnet 52 to the pole piece 55; one pole of the magnet consisting of the cylindrical pole piece 55 and the other pole being formed by the openings 56.

For the purpose of supporting the deflectable balance beam 40 of the balance assembly 10, there is provided a bracket 60 which is secured to the base plate 50 by means of screws 61 and is provided with a right angle flange portion 62 extending laterally from a vertical leg 63. The balance beam 40 is provided with a pair of vertically mounting flanges 64 and a pair of horizontal mounting flanges 65 although only one flange of each pair is visible in FIG. 1. Each of these flanges is provided with a central rivet receiving opening. To support the beam 40, resilient mounting elements or flexures 66 are connected to each of the flanges 64 and resilient mounting elements or flexures 67 are connected to each of the flanges 65. Specifically, the resilient elements 66 and 67 are each provided with enlarged end portions which are clamped to the corresponding flange portions of the beam 40 and to the supporting bracket 60. More particularly, the upper end portion of the element 66 is clamped between the bar 43 and the mounting flange 64 by means of rivets or the like while the lower end of each of the elements 66 is clamped between the leg portion 63 of the bracket 60 and a clamping plate 68 which extends across the bracket. The right-hand end of each of the elements 67, as viewed in FIG. 1, is clamped between the right angle legs 62 of the bracket 60 and a horizontal clamping plate 69 while the left-hand end of each of the elements 67 is clamped between one of the mounting flanges 65 and a horizontal clamping plate 70 extending between the flanges 65. The central portions of the resilient mounting elements 66 and 67 are offset with respect to the center lines of the end portions of these elements and the end portions of each pair of elements are oppositely disposed thereby providing a compact, crossed flexure mounting arrangement wherein the end portions of each pair of resilient elements are positioned in a common plane with respect to the axis of the beam 40. The intermediate portion of the beam 40 is provided with a troughlike portion 71 for increased rigidity of the beam and the beam is also provided with an enlarged flat end portion or control element 72 which acts as a planar control element of the force balance 10 since it carries the feedback coil of the oscillator circuit, as more fully described hereinafter.

In order to balance the beam 40 statically about its rotatable axis in one plane, there is provided a large headed screw 83 which extends through an opening in the beam and threads into a central opening extending transversely of the bar 43. A similar screw 84 is threaded into another aperture in the bar 43 in order to provide for adjustment of the static balance of the beam 40 in a plane at right angles to the first plane. After the screws 83 and 84 have been adjusted to obtain static balance of the beam 40 so that the center of gravity of the beam coincides with its center of rotation, these screws are held in place by means of suitable spring wire retainers which are not shown in the drawings but which engage the threads of these screws in a plane to develop side thrust thereon in a manner described in detail in the above-referenced application filed by Gilchrist, et al., to which reference may be had for a more complete description of the construction and operation of the balance assembly 10.

The beam 40 is preferably made of aluminum in order to reduce the inertial effects of the beam. The bar 43 is also preferably constructed of aluminum so as to have the same characteristics as the beam 40 and as a result, this bar acts as a counterweight to balance the weight of the end portion 72 of the beam. It will be noted that the bar 43 and the screws 83 and 84 are all mounted very close to the pivotal axis of the beam 40 so that the inertial effects, which vary as a function of the square of the distance of the pivot axis, are relatively small. The planar end portion 72 of the beam, on the other hand, is positioned as far as possible from the pivot axis while maintaining a compact structure so that a high torque-to-inertia ratio is achieved.

As indicated above, the pivotal movement of the operating lever 20 is transferred to the balance beam 40 by means of loading spring 41 secured to the bar 43 and lever 20. In order to limit the moving of the planar end portion 72 of the balance beam 40 toward the base plate 50, a stop pin 86 is provided near the lower edge of the base. Movement of the beam 40 in the opposite direction is limited by means of an adjustable screw 88 which is threaded through a printed circuit board 87 so that its end portion limits the beam 40 by engaging the trough 71, and which contains a lock nut 89 to secure the screw 88 in the desired position. The circuit board 87 is fixedly held in place by a plurality of screws 90 which are secured to the base plate 50. As more fully described in the aforementioned Gilchrist, et al. copending application, the printed circuit board 87 contains oscillator elements including a planar oscillator coil or control inductor 100 on its underside facing the control element 72 of the beam 40. A plate 101 of magnetizable material such as soft iron is secured to the end portion 72 of the beam 40 and moves toward or away from the oscillator coil 100 upon movement of the balance beam 40 thereby varying the inductance of the coil 100 in proportion to the deflection of the balance beam 40.

Since the balance beam 40 is moved by the spring 41 and vertically extending with lever 20 in proportion to the measured input variable, movement of the beam varies the inductance of the control inductor 100 which is connected to the oscillator to produce an output current from the oscillator as a function of the measured variable. A pair of conductors 102, 103 are connected to the circuit board 87 to supply the output current from the oscillator, which, as heretofore described, corresponds to a span of measured values relative to the range of output current values. A second pair of conductors 104, 105 are connected to the ends of a feedback coil 110 mounted on the end portion 72 of the balance beam 40 for movement through the annular air gap 57. The feedback coil 110 is wound upon a core 111 formed of a thin hollow sleeve of, for example, aluminum which acts as a shorted turn positioned within the air gap 57 to provide a damping action and at the same time to furnish a support for the feedback coil 110. The damping action provided by the aluminum core 111 effects stability of the transmitter unit and at the same time allows the use of an oscillator circuit having relatively high sensitivity. The feedback coil is wound so that it has a length substantially greater than the depth of the air gap 57 and, as a result, throughout the range of movement of the balance beam 40 between the limiting positions established by the stops 86 and 88 substantially the same number of turns of the feedback coil are positioned within the air gap and the force supplied to the beam 40 by virtue of the current flow through the feedback current is linearly related to the feedback current over the entire range of the balance unit. The feedback coil 110 acts to apply a force to the balance beam 40 in opposition to the movement of the motion transmitting lever 20 and the spring 41 to thereby counterbalance the beam 40.

Figure 2:
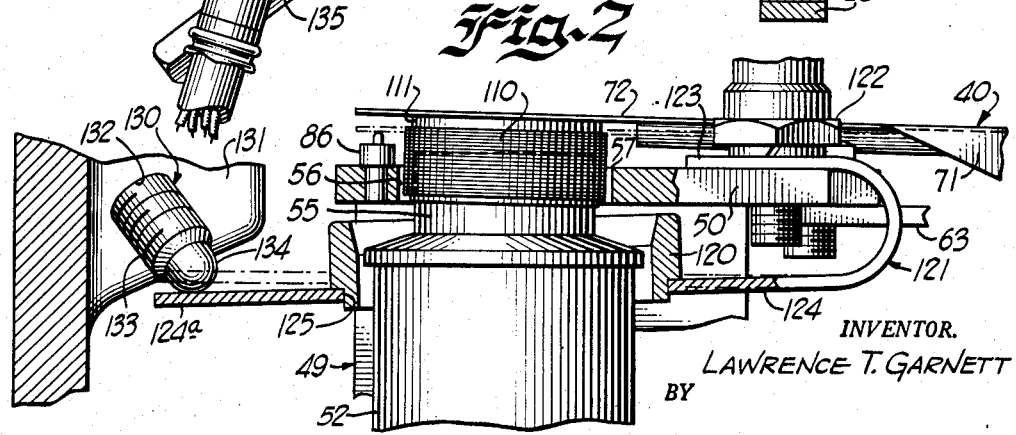
FIG. 2 is an enlarged fragmentary view illustrating the shunt ring and adjusting means.

According to the present invention, it is desirable to vary the span of measured values, as characterized by the movement of the lever 20 and the balance beam 40, relative to the predetermined range of output current values. As best seen in FIG. 2, this is readily accomplished by the provision of an annular shunting ring 120 of magnetic flux conductive material such as soft iron and positioned adjacent to the annular air gap 57 between one side of the magnetic frame 49 and the cylindrical pole piece 55 and adapted to bypass at least a portion of the magnetic flux normally established across the air gap 57 through which the feedback coil 110 moves. The U-shaped mounting bracket 121 has a first or short leg 123 connected to the base plate 50 by a plurality of terminal bolts 122, and a second or long leg 124 containing a central aperture 125 (FIG. 2) through which the cylindrical pole piece 55 of the magnet 52 extends. The annular shunting ring 120 is secured in the central aperture 125 about the pole piece 55 and in close proximity of the annular air gap 57 thereby diverting or shunting a part of the magnetic flux normally established across the air gap 57. The second or long leg 124 of the mounting bracket 121 has an end portion 124a extending beyond the shunt ring 120 and adapted to be engaged by an adjusting screw 130, the purpose of which will hereinafter be explained.

The base portion 12 of the housing 11 contains a boss 131 (FIG. 1) with a threaded aperture 132 extending through the boss 131 and base portion 12, through which the adjusting screw 130 extends. The adjusting screw 130 is angularly inclined toward both the base portion 12 and the long leg 124 of the mounting bracket 121. The adjusting screw 130 contains a threaded shank 133 adapted to cooperate with the threaded aperture 132, the inner end of the shank 133 containing a hardened contact semispherical ball portion 134 adapted to engage the long leg 124 of the mounting bracket 121, and the outer end 135 of the screw 130 connected to the outer end of the shank 133 and being adapted to receive a turning tool, and therefore being of hexagonal or square cross section, or containing a slot or similar device.

The shunting ring 120 is resiliently biased by the bracket 121 to a predetermined position with respect to one side of the base plate or frame 50, as shown in phantom in FIG. 2, so that the shunting ring, positioned relatively close to one side of the plate 50 when the bracket is biased to the predetermined position, shunts a part of the magnetic flux normally established across the air gap 57. However, the adjusting means including the adjusting screw 130 provide means adjustable from the exterior of the housing 11 for moving the leg 124 of the bracket which carries the shunting ring 120 away from the frame 50 against the force or bias of the resilient mounting bracket 121, thereby adjusting the shunting effect of the shunting ring 120. Since the adjusting screw 130 engages the long leg 124 of the mounting bracket 121 at an angle, a vernier adjustment of the mounting bracket 121 may be made; for example, a full turn of the adjusting screw 130 will move the end portion 124a of the long leg 124 a distance less than the pitch of a full thread. The adjusting screw is biased sideways by the engagement of the ball 134 with the resilient mounting bracket 121 and the adjusting screw 130 is thereby locked into any desired position.

By the inclusion of the shunting ring positioned between one side of the frame 50 and the cylindrical pole piece 55, it is readily possible to vary the span of measured values represented by the deflection of the lever 20 and corresponding deflection of the beam 40, relative to the predetermined range of obtainable output current values. Such variation of the span may readily be accomplished from the exterior of the explosion-proof housing 11 while the balance assembly 10 is sealed therein. The threaded engagement of the adjusting screw 130 with the threaded aperture 132 extending through the boss 131 and base 12 form a long and tortuous path for any flame or explosion which may occur within the housing 11 and such explosion or flame would extinguish itself before being projected outward of the housing 11 through the aperture 132. The adjusting screw 130 should, of course, have sufficient threads to permit a desired range of movement of the annular ring 120, as well as providing the long, tortuous sealing path.

While a particular embodiment of the invention has been shown, it will be understood, of course, that the invention is not limited thereto, since many modifications may be made, and it is therefore contemplated by the appended claims to cover any such modifications as fall within the true spirit and scope of the invention.

What is claimed as new and desired to be secured by Letters Patent of the United States is:

1. An electromechanical force balance unit comprising a sealed housing, a pivotally mounted beam positioned in said housing and including a control element portion, a control impedance positioned in said housing adjacent said control element so that movement of said beam varies the impedance of said control impedance, a generally rectangular frame positioned in said housing and having an aperture in one side thereof, a cylindrical pole piece secured to said frame on the side opposite said one side thereof and having an end portion of reduced diameter extending through said aperture to define an annular air gap therebetween, a coil supported on said beam and positioned in said air gap, a mounting bracket supported on said frame and having an opening through which said pole piece extends, means for resiliently biasing said bracket to a predetermined position with respect to said one side of said frame, a shunting ring positioned in said opening of said mounting bracket and enclosing said pole piece, said shunting ring being positioned relatively close to said one side of said frame when said bracket is biased to said predetermined position so as to shunt a part of the magnetic flux normally established across said air gaps, and means adjustable from the exterior of said housing for moving said mounting bracket away from said one side of said frame against the force of said biasing means, thereby to adjust the shunting effect of said ring.

2. An electromechanical force balance unit comprising a sealed housing, a pivotally mounted beam positioned in said housing and including a control element portion, a control impedance positioned in said housing adjacent said control element so that movement of said beam varies the impedance of said control impedance, a generally rectangular frame positioned in said housing and having an aperture in one side thereof, a cylindrical pole piece secured to said frame on the side opposite said one side thereof and having an end portion of reduced diameter extending through said aperture to define an annular air gap therebetween, a coil supported on said beam and positioned in said air gap, a mounting bracket supported on said frame and having an opening through which said pole piece extends, means for resiliently biasing said bracket to a predetermined position with respect to said one side of said frame, a shunting ring positioned in said opening of said mounting bracket and enclosing said pole piece, said shunting ring being positioned relatively close to said one side of said frame when said bracket is biased to said predetermined position so as to shunt a part of the magnetic flux normally established across said air gap, and means adjustable from the exterior of said housing for moving said mounting bracket away from said one side of said frame against the force of said biasing means, thereby to adjust the shunting effect of said ring, said adjusting means comprising an adjustable screw adapted to engage said mounting bracket at an angle relative to the plane thereof so that a vernier adjustment of said shunting effect may be made.

3. In an electromechanical system for measuring a variable, the combination including a sealed housing, a pivotally mounted beam positioned in said housing and including a control element portion, means for displacing said beam in an amount proportional to a measured variable, a control impedance positioned in said housing adjacent said control element so that movement of said beam varies the impedance of said control impedance, electrical means connected to said control impedance for developing an output current which varies in proportion to displacement of said beam, variation of said output current over a predetermined range of output values corresponding to variation of said measured variable over a corresponding span of measured values, magnetic circuit means defining a magnetic field within an annular air gap, a feedback coil carried by said beam and positioned in said air gap, means for energizing said feedback coil in proportion to said output current so that a force is exerted on said beam in opposition to said displacement, a shunting ring positioned in said housing adjacent said air gap and adapted to bypass around said air gap a part of the magnetic flux normally established across said air gap, and span adjustment means adjustable from the exterior of said housing for moving said shunting ring relative to said air gap, thereby to vary said span of measured values relative to said predetermined range of output current values.

4. In an electromechanical system for measuring a variable, the combination including a sealed housing, a pivotally mounted beam positioned in said housing and including a control element portion, means for displacing said beam in an amount proportional to a measured variable, a control impedance positioned in said housing adjacent said control element so that movement of said beam varies the impedance of said control impedance, electrical means connected to said control impedance for developing an output current which varies in proportion to displacement of said beam, variation of said output current over a predetermined range of values corresponding to variation of said measured variable over a corresponding span of measured values, a generally rectangular frame positioned in said housing and having an aperture in one side thereof, a pole piece extending through said aperture to define an annular air gap therebetween, a feedback coil carried by said beam and positioned in said air gap, means for energizing said feedback coil in proportion to said output current so that a force is exerted on said beam in opposition to said displacement a shunting ring positioned in said housing adjacent said air gap and adapted to bypass around said air gap a part of the magnetic flux normally established across said air gap, and span adjustment means adjustable from the exterior of said housing for moving said shunting ring relative to said air gap, thereby to vary said span of measured values relative to said predetermined range of output current values.

References Cited in the file of this patent

UNITED STATES PATENTS

| | | |
|---|---|---|
| 2,179,305 | Stickney | Nov. 7, 1939 |
| 2,513,900 | Thomander | July 4, 1950 |
| 2,623,741 | Brockhuysen | Dec. 30, 1952 |